United States Patent [19]
Gladd et al.

[11] 3,747,510
[45] July 24, 1973

[54] MEAT PROCESSING SYSTEM

[75] Inventors: Andrew J. Gladd, Northville; Ralph J. MacKay, Novi; Paul Gancia, Farmington, all of Mich.

[73] Assignee: Gladd Industries, Farmington, Mich.

[22] Filed: Feb. 22, 1972

[21] Appl. No.: 227,909

[52] U.S. Cl.............. 99/443 C, 99/468, 99/478, 198/219
[51] Int. Cl.............. A23b 1/04, A23l 3/02
[58] Field of Search............ 99/443 R, 443 C, 99/468, 352, 355, 477, 478, 107, 109; 198/20, 89, 219

[56] References Cited
UNITED STATES PATENTS

| | | | |
|---|---|---|---|
| 2,788,732 | 4/1957 | Templeton | 99/443 C X |
| 3,052,559 | 9/1962 | Peebles | 99/443 C X |
| 3,073,236 | 1/1963 | Blaschek et al. | 99/443 C X |
| 3,276,352 | 10/1966 | Allen et al. | 99/352 |
| 3,408,205 | 10/1968 | Olson et al. | 99/352 UX |
| 3,518,934 | 7/1970 | Davis et al. | 99/352 X |
| 3,552,300 | 1/1971 | Matzke et al. | 99/352 |
| 3,552,543 | 1/1971 | Manetta | 198/219 |
| 3,565,241 | 2/1971 | Race et al. | 198/219 |
| 3,590,987 | 7/1971 | Evans et al. | 198/219 |
| 3,643,587 | 2/1972 | Harrington et al. | 99/477 |

Primary Examiner—John Petrakes
Assistant Examiner—Arthur O. Henderson
Attorney—Gerald E. McGlynn, Jr., Owen E. Perry et al.

[57] ABSTRACT

Meat processing apparatus including an elongate enclosure having an inlet end and outlet end with a plurality of treatment zones defined therein. A plurality of walking beam conveyors are mounted in the enclosure and extend from the inlet to the outlet end and are movable between a retracted position in the direction of the inlet and an extended position in the direction of the outlet. Lifting means are located in each treatment zone for lifting meat and similar products from the conveyors prior to a retraction movement of the conveyors, and to subsequently return the products onto the conveyor prior to an extension movement of the conveyors to cause the products to advance toward the outlet end and to control the time required to advance the products through each treatment zone. A plurality of transverse partitions define the end walls of the treatment zones, and an opening in each of the partitions permits movement of products into and out of the treatment zones by the walking beam conveyors. A door is mounted on each partition for movement between opened and closed positions with respect to the opening. The partitions are formed with slots for slidably receiving the walking beam conveyors and permitting the reciprocation of the walking beam conveyors in any position of the doors.

34 Claims, 10 Drawing Figures

PATENTED JUL 24 1973

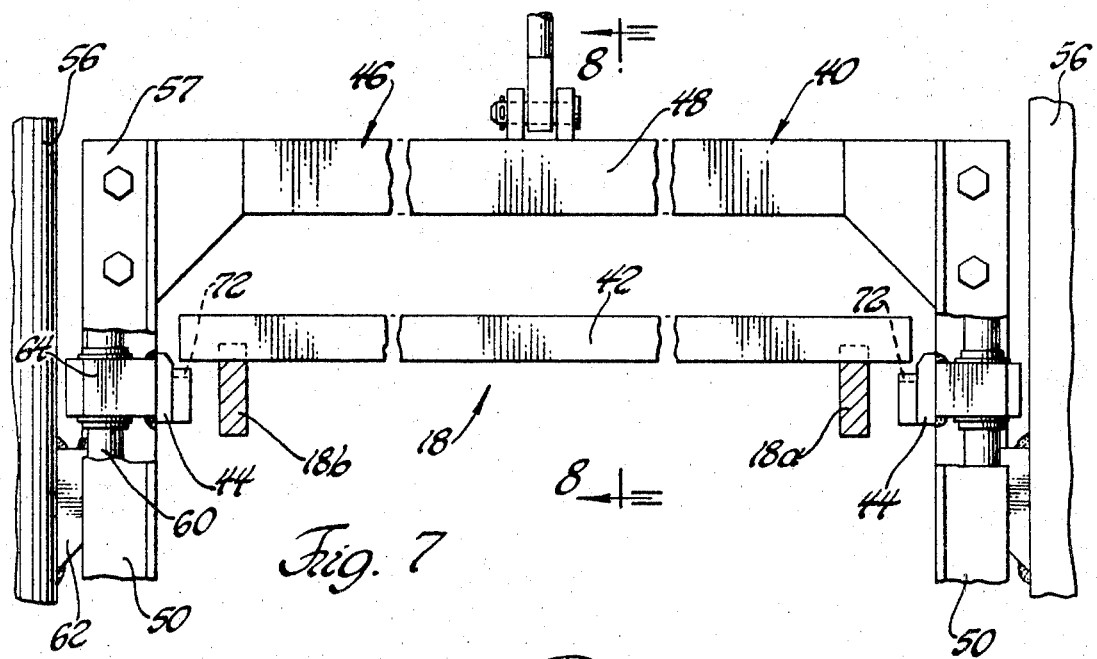
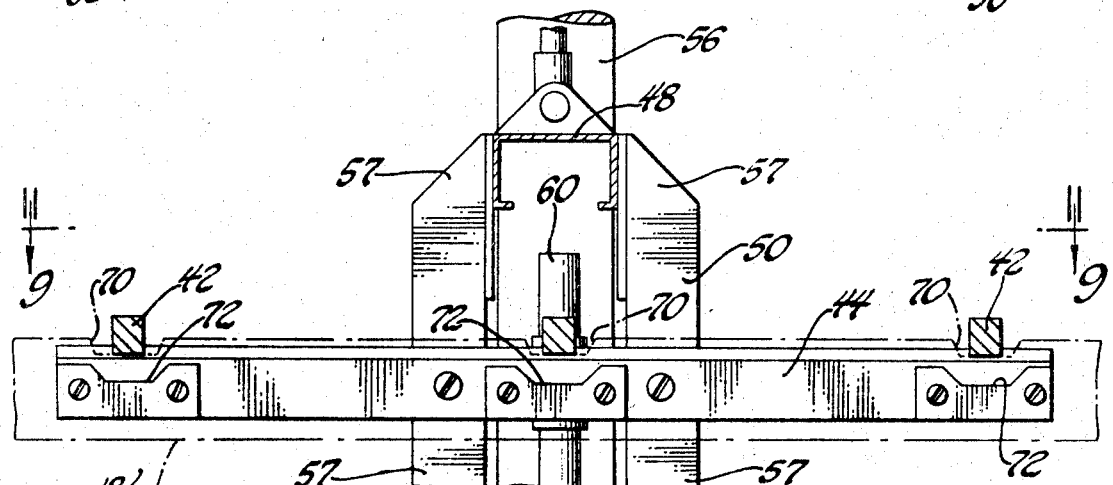
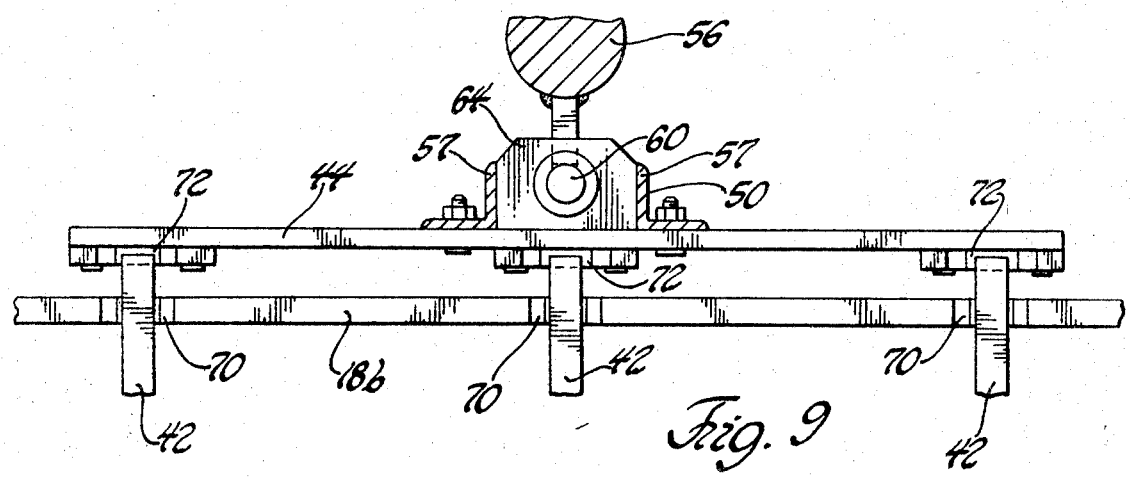

MEAT PROCESSING SYSTEM

This invention relates generally to apparatus for cooking and processing meat and similar products, and is particularly concerned with apparatus for simultaneously processing large quantities of different types of meat products wherein varying treatment times are required in each treatment zone of the apparatus for the different products.

In the cooking and curing of various types of meat, it is generally desirable to subject the meat to varying temperature conditions for varying lengths of time, and to cool and otherwise process the meat at a controlled rate and in controlled stages. The rate of treatment, and the rate of cooking and curing, varies with different types of meat products such as poultry, bacon, ham, sausage, frankfurters, etc. Generally, the prior art apparatus of this type is capable of processing only one type of meat product and cannot simultaneously process several types of product each requiring different rates of processing.

Prior art apparatus in this field is generally limited to one product due to the conveying apparatus for moving the products through the various treatment zones of the process. The conveyors move the products at a constant rate through the processing apparatus so that all of the products on the conveyor are treated at the same rate. Thus, in order to simultaneously treat different meat products in the same apparatus, a conveyor system must provided that will permit the different products to move at different rates through the various treatment zones so that, for example, a ham can be caused to dwell in a particular high temperature treatment zone for a longer period of time than frankfurters or similar products requiring less time in the particular zone. The conveyor system must also be such that the treatment zones can be separated from each other so that adjacent treatment zones can be maintained at different temperatures, humidities and other conditions for curing, cooking or other types of processing. Examples of prior art meat treating and conveying apparatus are disclosed in U.S. Pat. Nos. 188,548; 1,964,297; 2,416,763; 3,016,004; 3,052,559; 3,221,870; and 3,518,934.

An object of this invention is to provide meat processing apparatus for processing large quantities of various types of meat products simultaneously wherein the different products can be caused to move through a treatment zone at varying rates as required.

A further object is to provide meat processing apparatus including at least one treatment zone for processing meat and similar products with conveying means for conveying products through the treatment zone, and means in the treatment zone for selectively lifting products from the conveying means and subsequently returning the products onto the conveying means to control the time that the product dwells in the treatment zone.

In carrying out the foregoing, and other objects, meat processing apparatus according to the present invention includes an elongate enclosure having an inlet end and an outlet end with a plurality of treatment zones defined therebetween. A plurality of walking beam conveyors extend from the inlet end to the outlet end and are movable between a retracted position in the direction of the inlet and extended position in the direction of the outlet. Lifting means located in each treatment zone is operable to lift products carried by each conveyor from the respective conveyor prior to a retraction movement of the conveyor and to return the product onto the conveyor prior to an extension movement of the conveyor at a selected time so that the dwell time of the product in the treatment zone can be selectively controlled. A plurality of transverse partitions defines the end walls of the treatment zones, and an opening is provided in each of the partitions to permit movement of products into and out of the treatment zones by the conveyors. A door is slidably mounted on each partition for movement between open and closed positions with respect to the opening therein, and each of the partitions is formed with slots receiving the walking beam conveyors and permitting a reciprocation thereof in any position of the doors.

Other objects, advantages and features of the invention will become apparent from the following description taken in connection with the accompanying drawings in which:

FIG. 1 is an elevational view, partially in section, of meat processing apparatus according to the present invention;

FIG. 1a is a view taken in lines 1a—1a of FIG. 1;

FIG. 7 is an elevational view of a portion of a typical lifting apparatus as viewed approximately on lines 7—7 of FIG. 1;

FIG. 8 is a view taken on lines 8—8 of FIG. 7; and

FIG. 9 is a view taken on lines 9—9 of FIG. 8.

Figures 1, 1A:
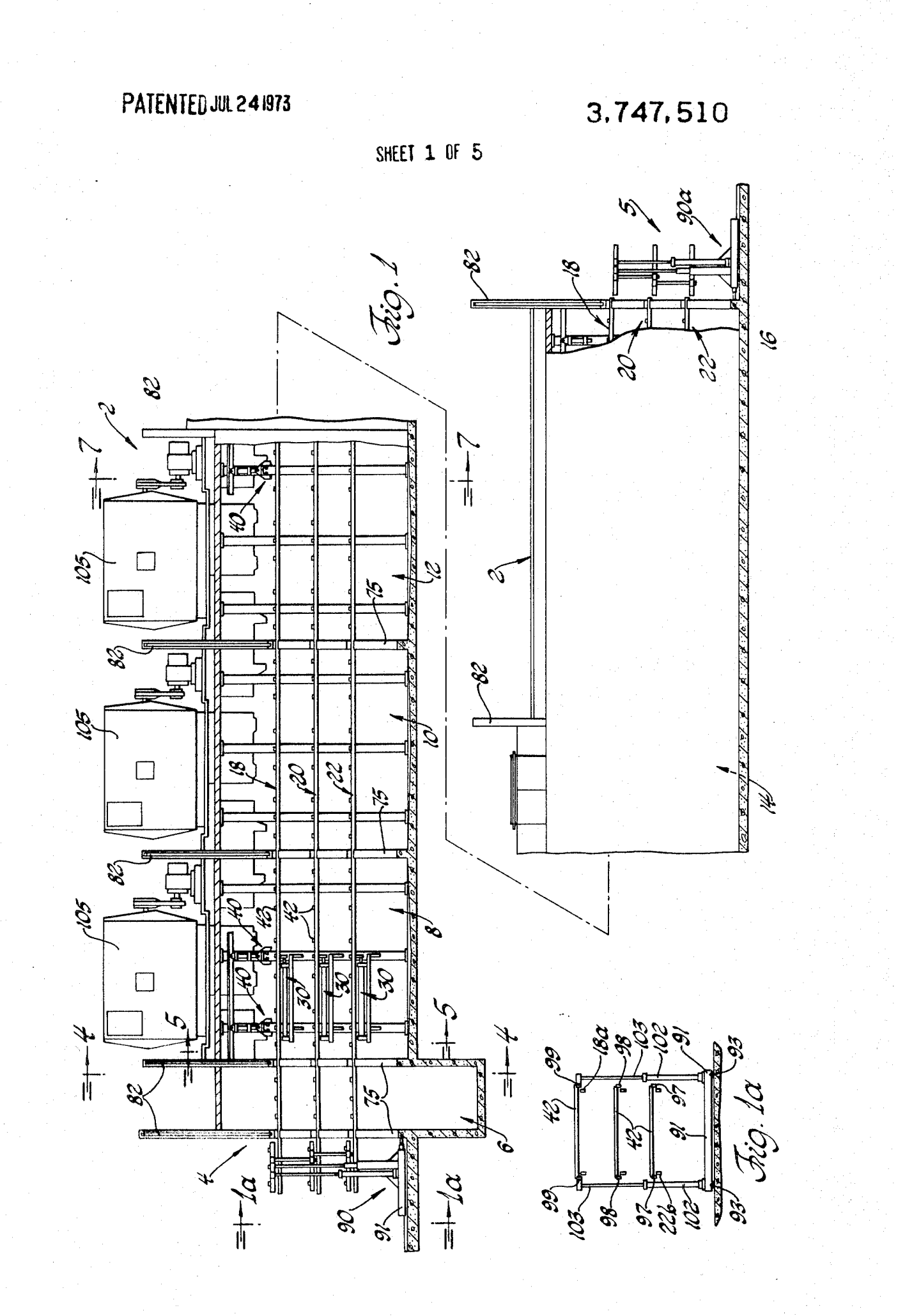
Figure 2:
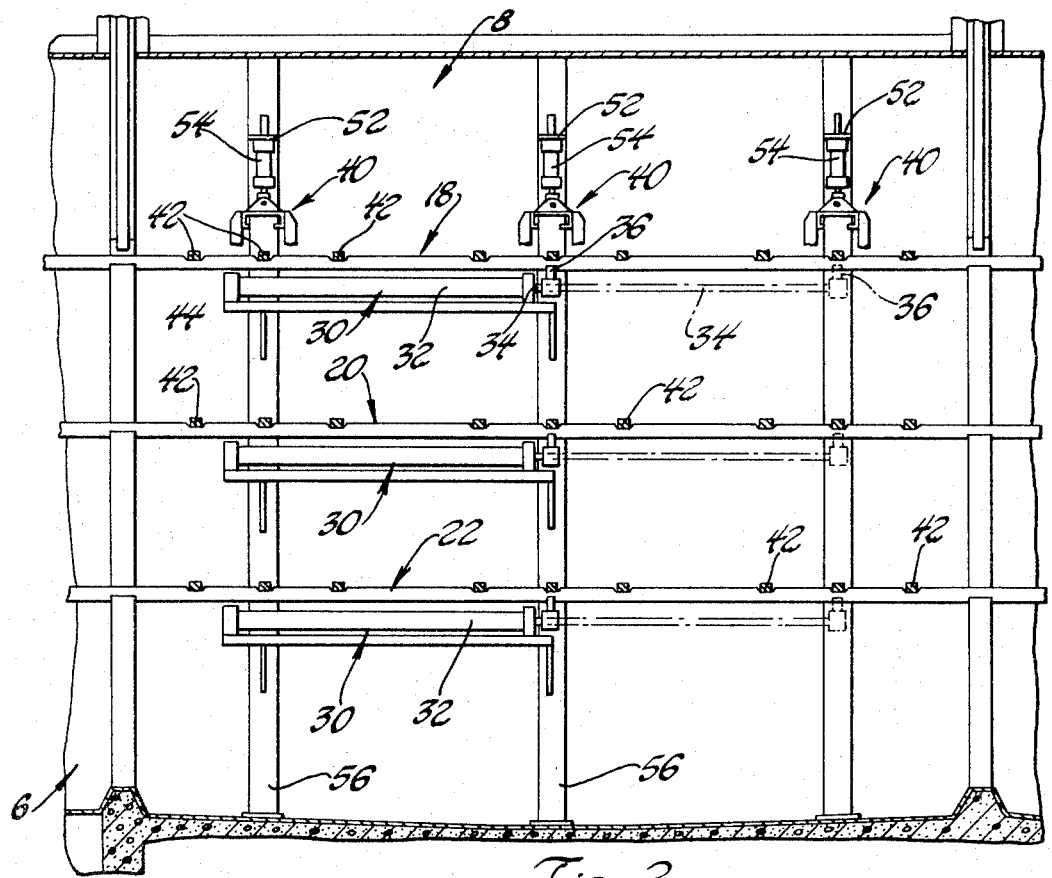
FIG. 2 is an enlargement of a portion of FIG. 1.

In FIG. 1, reference numeral 2 collectively designates an elongated enclosure having an inlet end indicated generally by reference numeral 4 and outlet or discharge end indicated generally by reference numeral 6. References numerals 6, 8, 10, 12, 14 and 16 indicate treatment zones defined between the ends of the enclosure 2.

Figure 4:
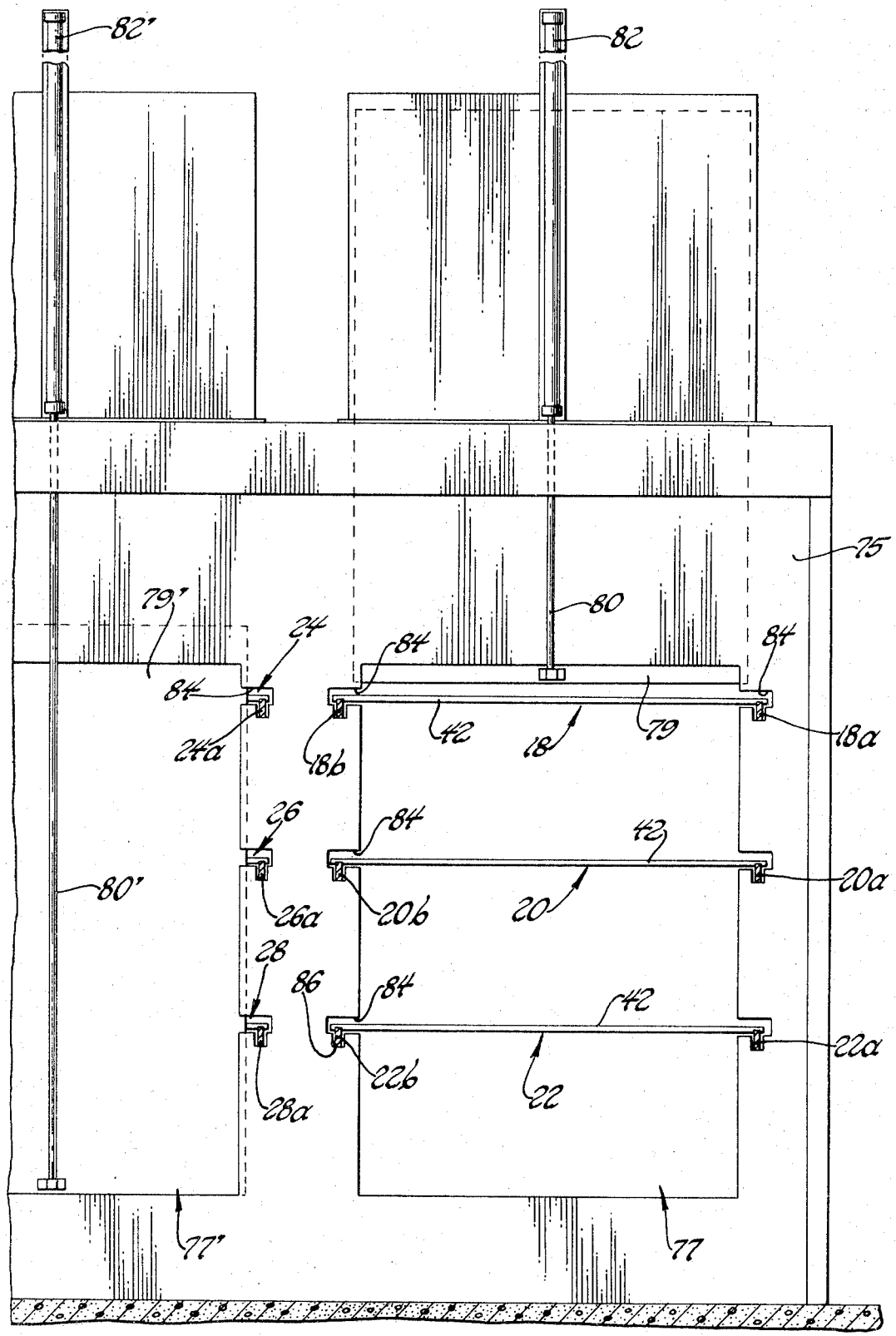
FIG. 4 is a transverse sectional view taken on lines 4—4 of FIG. 1.
Figure 5:
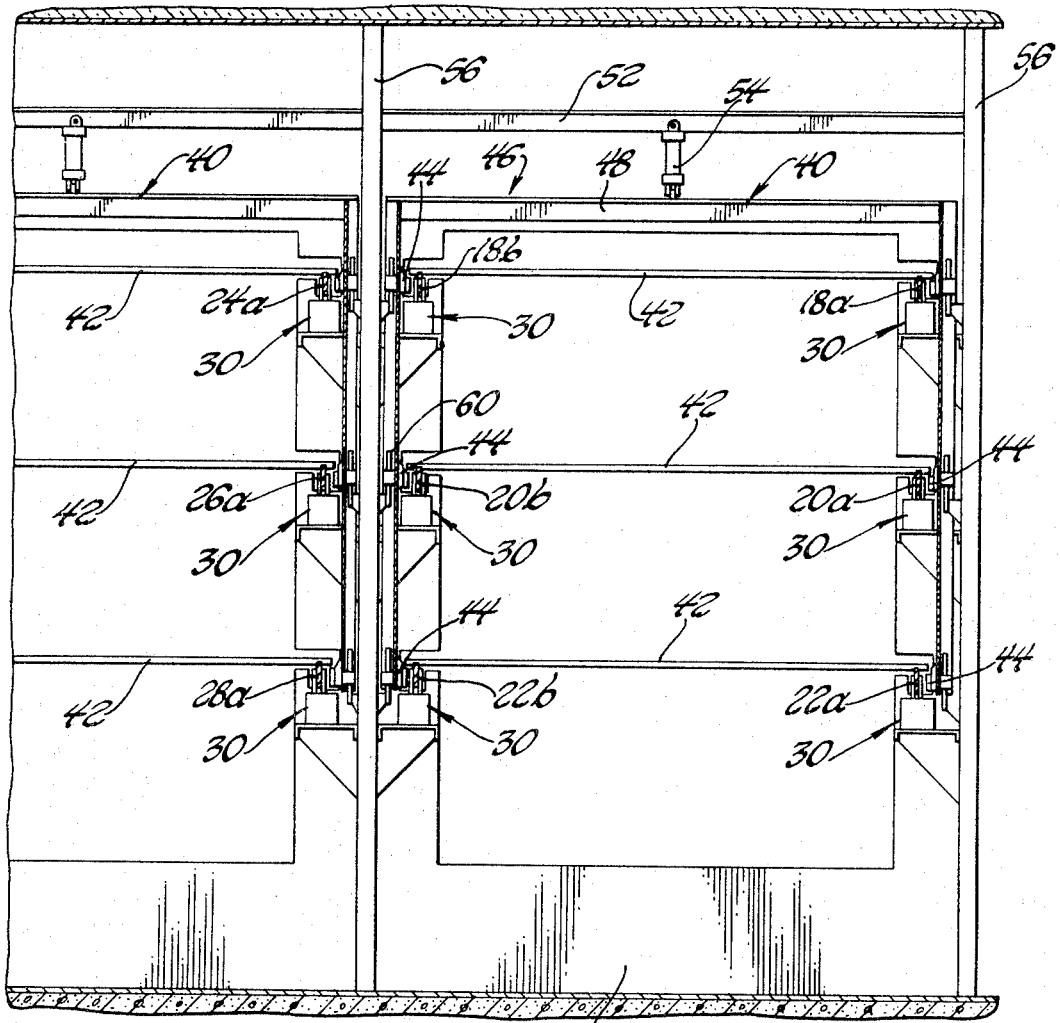
FIG. 5 is a view taken on lines 5—5 of FIG. 1.

A plurality of walking beam conveyors extend through the enclosure 2 from the inlet to the outlet. The walking beam conveyors are designated by reference numerals 18, 20, 22, 24, 26 and 28 (FIGS. 1, 4 and 5). As shown in the drawings, with particular reference to FIGS. 4 and 5, the conveyors are arranged in two side by side groups, one group including conveyors 18, 20 and 22 and the other group including conveyors 24, 26 and 28. Each conveyor comprises a pair of transversely spaced walking beams. The right-hand walking beam for each conveyor is designated by the reference numeral for that conveyor with the subscript $a$, and the left-hand walking beam is designated by the same reference numeral for the conveyor followed by the subscript $b$. Thus, the right-hand walking beam for conveyor 18 is indicated by reference numeral 18a, and the left-hand walking beam for conveyor 18 is designated by the reference numeral 18b. The left-hand walking beams for the conveyors 24, 26 and 28 are not visible in the drawings. As shown in the drawings, the two side by side groups each includes three vertically spaced conveyors. Thus, the right-hand group in FIG. 4 includes the vertically spaced conveyors 18, 20 and 22, while the left-hand group in FIG. 4 includes the vertically spaced conveyors 24, 26 and 28.

Figure 6:
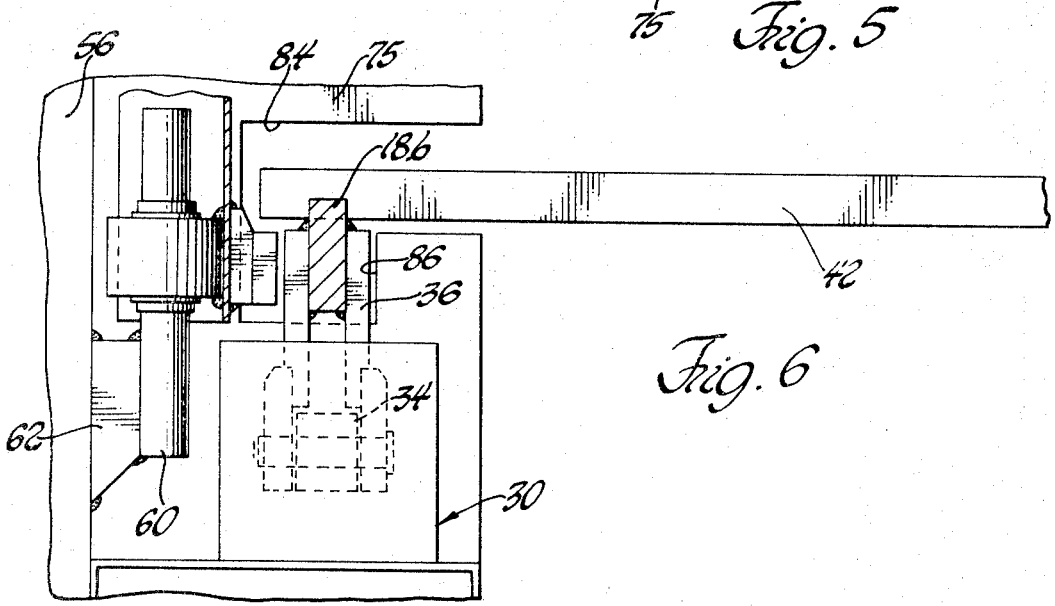
FIG. 6 is an enlarged detail of a portion of the apparatus shown in FIG. 5.

Each of the walking beams is operated by a hydraulic actuator 30 to reciprocate between a retracted position in the direction of the inlet 4 (the position illustrated in FIG. 1) and an extended position in the direction of the outlet 5. With reference to FIG. 2, each of the hydraulic actuators 30 includes a cylinder 32 having a piston reciprocable therein with a piston rod 34 secured to the associated walking beam by a clevis 36 (FIG. 6). When the piston rods 34 are retracted to their full line positions shown in FIG. 2, the associated walking beams are actuated to its retracted position. When the piston rods 34 are extended to their phantom line positions shown in FIG. 2, the associated walking beams are actuated to the extended position.

Lifting devices designated generally be reference numeral 40 are located in each treatment zone and are operable to lift products carried by the conveyors 18-28 from the respective conveyors prior to a retraction movement of the conveyors, and are operable to return the products onto the conveyors prior to an extension movement of the conveyors to cause the products to advance through the treatment zones at a rate determined by the time the products are prevented from advancing with the conveyors. The meat products to be processed are supported on transverse rods 42 which can be carried either by the walking beams or the lifting devices 40 as is set forth in detail below.

The lifting devices 40 are illustrated in detail in FIGS. 7, 8 and 9 and each includes a pair of transversely spaced, vertically movable lifting arms 44 cooperable with each conveyor. As shown in FIG. 7, the walking beams 18a and 18b of conveyor 18 are located between a pair of lifting arms 44.

The lifting arms 44 are supported for vertical movement on a lifting frame 46. A lifting frame is provided for each of the two side by side groups of conveyors, and each lifting frame has a plurality of vertically spaced pairs of lifting arms corresponding in number to the number of conveyors of the group being carried by the lifting frame. Thus, each of the pair of walking beams of each conveyor is located between a pair of lifting arms 44.

The lifting frame 46 includes a horizontal base frame member 48 extending transversely of the walking beams, and a pair of transversely spaced side frame members 50 extending vertically from the ends of the base frame member 48. The lifting arms 44 are each carried by one of the side frame members 50. An overhead support member 52 in the treatment zone is provided for each lifting frame, and a hydraulic power unit 54 of conventional piston and cylinder construction is connected between the overhead support 52 and the base frame member 48 for selectively raising and lowering the lifting frame 46 with respect to the support member 52.

Mounted in the treatment zone adjacent each of the side frame members 50 of each of the lifting devices 40 is a vertical guide post 56. As shown in FIGS. 7, 8 and 9, each of the side frame members 50 of the lifting devices 40 is made up of a pair of angles 57 spaced on opposite sides of the base frame member 48. Guide means on the guide posts 56 and side frame members 50 slidably connects the side frame members to the guide posts. The guide means comprises a guide pin 60 mounted on a bracket 62 welded to the guide post 56, and an apertured plate member 64 which receives the guide pin 60 and is carried between the angles 57 of the side frame member 50. Thus, the plate member 64 is slideabley engaged with the pin 60 as the lifting device 40 is raised and lowered.

The meat supporting rods 42 are received in walking beam rod holding means in the form of recesses 70 spaced along the lengths of the walking beams with the recesses 70 in one walking beam being in coaxial alignment with the recesses in its associated walking beam. Lifting arm rod holding means in the form of upwardly opening recesses 72 spaced along the length of the lifting arms 44 are engageable with the ends of the rods 42 when the lifting device 40 is raised from the position illustrated in FIG. 7. The recesses 72 in the left-hand lifting arm 44 in FIG. 7 are in coaxial alignment with the recesses 72 in the right-hand lifting arm 44 in FIG. 7, and the spacing between the recesses 72 are the same as the spacing between the recesses 70 of the walking beams such that the recesses 72 are each in coaxial alignment with a recess 70 in either the extended or retracted position of the walking beam. Thus, when the walking beams of conveyor 18 are in the extended position, upward movement of a lifting device 40 will cause a pair of lifting arms 44 to engage the ends of rods 42 adjacent to the upwardly moving lifting device to raise the support rods 42 from the walking beams 18a and 18b. The rods 42 will thus not be effected by subsequent retraction of the walking beams 18a and 18b. When it is desired to return the raised support rods 42 to the walking beams so that the rods can be advanced toward the outlet 5 of the apparatus, the lifting device 40 is lowered while the walking beams 18a and 18b are in the retracted position. As the lifting device 40 moves downwardly, the rods 42 are returned to the recesses 70 of the walking beams 18a and 18b and the lifting arms 44 are disengaged from the rods 42. Subsequent extension of the walking beams 18a and 18b will advance the rods 42 toward the outlet 5.

Each end of each treatment zone is closed by a transverse partition 75 (FIG. 4). An opening is formed in the partition for each group of conveyors permitting movement of products into and out of the treatment zone through that opening. Each opening is controlled by a door mounted on the partition for movement between open and closed po-sition with respect to the respective opening. In FIG. 4, the right-hand door 79 for opening 77 is in an open position, and the left-hand door 79' for opening 77 is in a closed position. The doors 79 and 79' are operated by conventional hydraulic piston and cylinder assemblies 80, 80' and 82, 82'. When the piston rod 80 is in the retracted position shown in the right-hand portion of FIG. 4, the door 79 will be raised to its open position permitting rods 42 and any products carried thereby to pass through the partition into or out of the treatment zone. When the rod 80' is in the extended position as shown in the left-hand portion of FIG. 4, the door 79' is closed.

A pair of slots 84 is formed on each side of each opening for each of the walking beam conveyors. Each of the slots 84 is formed with a downwardly extending portion 86 (FIG. 6) for receiving a walking beam. Consequently, the walking beams are supported reciprocably in the partitions and are moveable between their extended and retracted positions in any position of the doors 79 and 79'. The doors can remain closed to maintain the proper conditions between the adjacent treatment zones except when it is neccessary for products supported on rods 42 to pass through the opening 77 or 77' from one treatment zone to another.

Reference numeral 90 collectively designates loading means (FIGS. 1, 1a and 3) for loading products onto the conveyors. The loader 90 includes a carriage 91 mounted for horizontal movement along tracks 93 toward and away from the inlet end 4 of the enclosure 2. The carriage 91 may be powered to move between a first position extended away from the inlet end 4 of the enclosure 2 (the position illustrated in FIG. 3) and a second retracted position located adjacent to the inlet end 4 of the enclosure 2 (the position illustrated in FIG. 1) by a hydraulic actuator 92 having a cylinder secured to the carriage 91 and a piston slidably mounted in the cylinder and secured to the structure of enclosure 2. Extension of the piston of the actuator 92 causes the carriage to move to the extended position of FIG. 3, and retraction of the piston of the actuator 92 into the cylinder causes the carriage to move to the retracted position shown in FIG. 1.

Mounted on opposite sides of the carriage 91 (FIG. 1a) a pair of extendable upright support members each including three telescopic sections 94, 95 and 96. Secured to the upper end of the upper telescopic section 96 is a horizontal loading rack 99. Depending from the loading rack 99 is a support rod 100 which is slidably engaged with a loading rack 98. The loading rack 98 in turn has a supporting rod 101 depending therefrom which is slidably engaged with a lower loading rack 97. Rod 100 is slidably received in a bracket 100a secured to the loading rack 98, and the lower end of rod 100 is enlarged so that it cannot pass through the bracket 100a and abuts the lower side of bracket 100a to limit the amount of separation between loading rack 98 and 99. Rod 101 is of identical construction to rod 100 and is similarly slidably secured to the loading rack 97.

Figure 3:
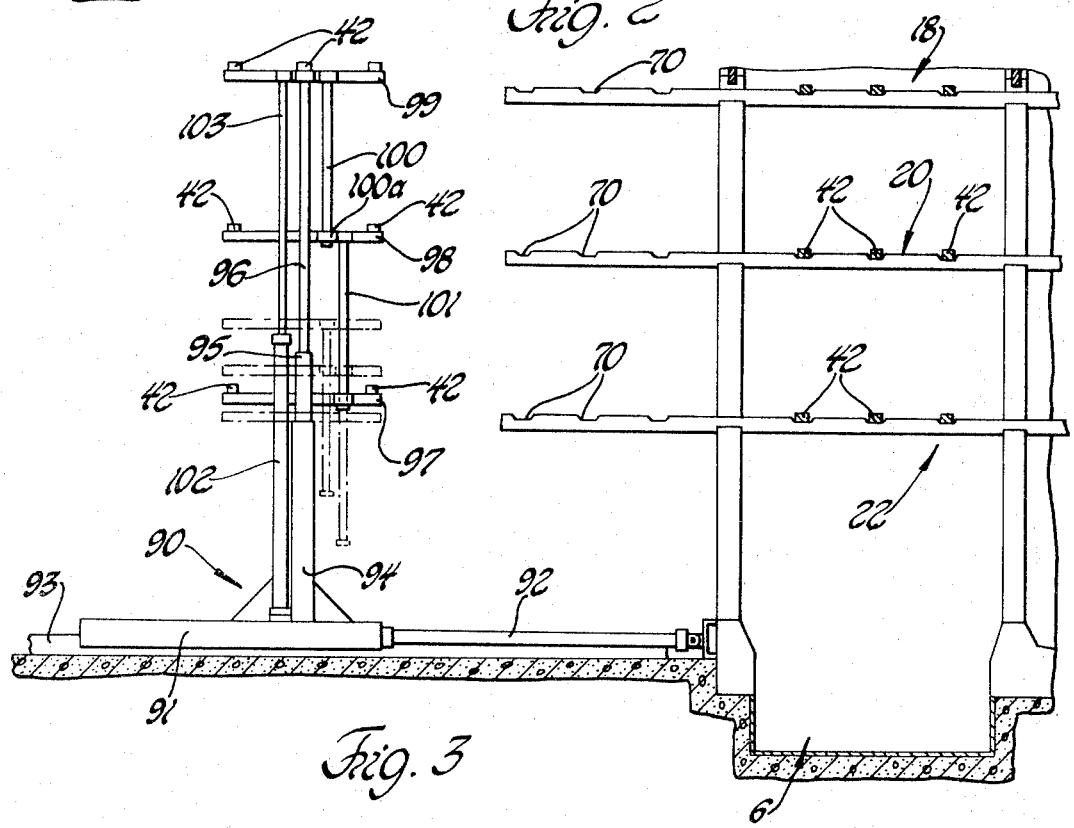
FIG. 3 is an enlargement of the left end of FIG. 1 with the loading apparatus in a different position.

The telescopic sections 94, 95 and 96 are actuated between their extended positions shown in full lines in FIG. 3 and a collapsed or retracted position illustrated in phantom lines in FIG. 3 by a hydraulic actuator including a cylinder 102 secured at one end to the carriage 91 and a piston 103 secured at its upper end to the loading rack 99. Starting from the collapsed position illustrated in phantom lines in FIG. 3, extension of the piston 103 causes the loading rack 99 to move upwardly. Rack 99 moves upwardly relative to the rack 98 until the lower, enlarged end of the rod 100 engages the bracket 100a, at which time, the rack 98 is carried upward by the further upward movement of rod 100. Similarly, the rack 98 moves upwardly relative to the rack 97 until the lower end of rod 101 engages the bracket on rack 97. In the fully extended position shown in FIG. 3, the racks 97, 98 and 99 are spaced apart from each other a distance determined by the lengths of rods 100 and 101.

With loading apparatus 90 in the collapsed position shown in phantom lines in FIG. 3, product support rods 42 may be placed on the loading racks 97, 98 and 99 and the products to be processed supported on the rods. The loading apparatus 90 is then extended to the full line position shown in FIG. 3 wherein the rods 42 on the loading racks 97, 98 and 99 are held above the respective conveyors 22, 20 and 18. Retraction of the hydraulic actuator 92 moves the loading device 90 to the position shown in FIG. 1. Subsequent retraction of the piston 103 into the cylinder 102 lowers the racks 97, 98 and 99 to deposit the rods 42 onto the respective conveyors 22, 20 and 18. The loading racks 97, 98 and 99 may be provided with grooves or other rod holding devices for spacing the rods 42 on the loading racks in accordance with the spacing of the grooves 70 on the conveyors so that when the loading device 90 is in the position of FIG. 1, the rods 42 are in registry with the grooves 70 at the inlet ends of the conveyors when the conveyors are in the retracted position of FIGS. 1 and 3.

An unloading device 90a is provided at the outlet end 5 of the enclosure 2 as shown in FIG. 1a, the unloading device 90a being of identical construction to the loading device 90. Thus, when the walking beam conveyors 18, 20 and 22 are in the extended position so that the discharge ends thereof are extended from the outlet end 5, the unloading device 90a can remove product support rods 42 from each of the conveyors upon extension of the unloading device so that the rods 42 can then be lowered to a more convenient position to be removed from the unloading device 90a.

The various hydraulic actuator assemblies for the doors, lifting apparatus, walking beam conveyors, and loading and unloading devices, maybe controlled individually from a remotely located central control console. Thus, a product requiring a long dwell time in zone 10, for example, may be held in zone 10 for the appropriate length of time by simply actuating the lifting device 40 to a raised position and causing it to remain in the raised position to support the products above the conveyors for the length of time desired. Other products requiring treatment for a less time period in zone 10 can be started through the system on the same conveyors and controlled by the operator to reach zone 10 at the time required to begin moving the first product from zone 10 and advancing it toward the outlet end. The lifting devices for the separate, side by side groups of conveyors, can be individually controlled to cause the products to advance at any desired rate through the processing enclosure. The products on one group of conveyors can be caused to dwell in a particular treatment zone for a time different than the products on a different group of conveyors, wth both types of products moving through the enclosure on the respective conveyor groups simultaneously.

The enclosure 2 may be constructed in modular sections for each zone so that the sections can be prefabricated at one location and transported to the site to be attached to the other section. In the illustrated embodiment of FIG. 1, the first zone 6 may be constructed from a module having the first or left hand partition 75 and corresponding door 77 and actuator assebmblies 80, 82 (or 80' 82'). The second zone 8 may be constructed from a module including two partitions 75 and corresponding doors and actuators. The third zone 10 may be constructed from a module having no doors or partitions 75, with the fourth zone 12 having two partitions and doors in its respective module, and so forth.

In the illustrated embodiment of FIG. 1, the first zone 6 may be a liquid smoke zone for smoke-treating products as the products enter the enclosure 2 on either of the conveyors of the side by side groups of conveyors. The second, third and fourth zones 8, 10 and 12, respectively, may be cooking zones each maintained at different temperature levels. The fourth zone 14 may be a cooling zone wherein the products are cooled either by cold air or possibly by liquid spray. The sixth zone 16 may be a blast chill zone for spraying the products with a cooling liquid prior to unloading the products from the outlet end 5. Reference numeral 105 indicates conventional blowers for conducting air at the appropriate temperature into zones 8, 10 and 12. Appropriate conventional spray and air-cooling apparatus is provided for zone 14 and 16.

While one specific form of the invention has been illustrated and described in the foregoing specification and accompaying drawings, it should be understood that the invention is not limited to the exact construction shown. Alterations and variations in the construction and arrangement of parts, all falling within the scope and spirit of the invention, will be apparent to those skilled in the art.

The embodiments of the invention in which an exclusive property or privilege is claimed are defined as follows:

1. Meat processing apparatus comprising: means defining at least one treatment zone for processing meat and similar products; conveying means for conveying products through the treatment zone; and lifting means in said treatment zone for lifting products from said conveying means and subsequently returning the products onto the conveying means to control the rate of advancement of the product and the time the product is present in the treatment zone.

2. Apparatus as claimed in claim 1 wherein said conveying means comprises reciprocating conveyor means.

3. Apparatus as claimed in claim 2 wherein said reciprocating conveyor means comprises a pair of transversely spaced walking beams reciprocable between extended and retracted positions.

4. Apparatus as claimed in claim 3 further including product support means alternately engageable with said walking beams and lifting means for supporting products to be treated for movement through the treatment zone.

5. Apparatus as claimed in claim 4 wherein said lifting means comprises a pair of transversely spaced, vertically movable lifting arms movable in one direction to engage and lift the product support means from the walking beams, and movable in the opposite direction to return the product support means to the walking beams.

6. Apparatus as claimed in claim 5 wherein said lifting means further comprises a vertically movable frame, said lifting arms being carried by said frame.

7. Apparatus as claimed in claim 6 wherein said frame includes a horizontal base frame member extending transversely of said walking beams, and a pair or transversely spaced side frame members extending vertically from the ends of said base frame member, said lifting arms each being carried by one of said side frame members.

8. Apparatus as claimed in claim 7 further including at least one guide post in said treatment zone, and guide means on said post and one side frame member of said lifting means slidably connecting said one side frame member and guide post.

9. Apparatus as claimed in claim 8 wherein said guide means comprises a guide pin mounted on said post, and an apertured plate mounted on said side frame member and slideably receiving said guide pin.

10. Apparatus as claimed in claim 9 wherein said product support means comprises a plurality of rod members each having a length such that it is engageable by both said walking beams and said lifting arms when disposed transversely with respect thereto.

11. Apparatus as claimed in claim 10 further including walking beam holding means on said walking beams for engaging and holding said rod members against movement with respect to said walking beams along the lengths thereof.

12. Apparatus as claimed in claim 11 wherein said walking beam rod holding means comprises a plurality of recesses formed in the upper surfaces of said walking beams and spaced along the lengths thereof with the recesses in one walking beam being in coaxial alignment with the recesses in the other walking beam in the extended and retracted positions of the walking beams.

13. Apparatus as claimed in claim 12 further including lifting arm rod holding means on said lifting arms for engaging and holding at least one of said rod members against movement with respect to said lifting arms along the lengths thereof when said rod member is removed from said walking beams by said lifting arms.

14. Apparatus as claimed in claim 13 wherein said lifting arm rod holding means comprises a plurality of upwardly opening recesses spaced along the length of said lifting arms with the recesses in one lifting arm being in coaxial alignment with the recesses in the lifting arm, and the spacing between the lifting arm recesses being the same as the spacing between the walking beam recesses such that the lifting arm recesses are each in coaxial alignment with a walking beam recess in either the extended or retracted position of the walking beams.

15. Apparatus as claimed in claim 14 further including a transverse partition defining one end of said treatment zone; an opening formed in said partition providing access to said treatment zone; a door mounted on said partition for movement between open and closed positions with respect to said opening; and a pair of slots in said partition each located adjacent an opposite side edge of said opening, said walking beams each being slidably received in one of said slots such that the walking beams are reciprocable between their extended and retracted positions in any position of said door.

16. Apparatus as claimed in claim 3 further including a transverse partition defining one end of said treatment zone; an opening formed in said partition providing access to said treatment zone; a door mounted on said partition for movement between open and closed positions with respect to said opening; and a pair of slots in said partition each located adjacent an opposite side edge of said opening, said walking beams each being slidably received in one of said slots such that the walking beams are reciprocable between their extended and retracted positions in any position of said door.

17. Apparatus as claimed in claim 16 wherein said door is mounted in said partition for vertical sliding movement between its open and closed positions with respect to said opening.

18. Apparatus as claimed in claim 1 wherein said door is mounted in said partition for vertical sliding movement between its open and closed positions with respect to said opening.

19. Apparatus as claimed in claim 1 wherein said conveying means comprises a plurality of walking beam conveyors each reciprocable between extended and retracted positions.

20. Apparatus as claimed in claim 19 wherein said conveyors are arranged in at least two side by side groups, each group including a plurality of vertically spaced conveyors.

21. Apparatus as claimed in claim 20 wherein each conveyor comprises a pair of transversely spaced walking beams.

22. Apparatus as claimed in claim 21 wherein said lifting means comprises a pair of transversely spaced, vertically movable lifting arms cooperable with the walking beams of each conveyor.

23. Apparatus as claimed in claim 22 wherein said lifting means further includes lifting a frame for each group of conveyors with a plurality of vertically spaced pairs of lifting arms corresponding to the number of conveyors of the group being carried by said lifting frame.

24. Apparatus as claimed in claim 23 wherein said lifting frame includes a horizontal base frame member extending transversely of said walking beams, and a pair of transversely spaced side frame members extending vertically from the ends of said base frame member, said lifting arms each being carried by one of said side frame members.

25. Apparatus as claimed in claim 24 including support means in said treatment zone for each lifting frame, and power means connected between said support means and lifting frames for selectively raising and lowering said lifting frames.

26. Apparatus as claimed in claim 25 further including at least one guide post in said treatment zone, and guide means on said post and one side frame member of said lifting frame slidably connecting said lifting frame with said guide post during vertial movement of said lifting frame.

27. Apparatus as claimed in claim 21 further including a transverse partition defining one end of said treatment zone, a plurality of side by side openings in said partition corresponding to each side by side group of conveyors; and a plurality of doors mounted on said partition each controlling one of said openings and movable between open and closed positions with respect to its associated opening.

28. Apparatus as claimed in claim 27 further including a slot in said partition adjacent said openings for each walking beam permitting the walking beam to reciprocate in its slot in any position of the doors.

29. Apparatus as claimed in claim 28 wherein each door is vertically slidable between its open and closed positions, and further including power means for selectively operating the doors.

30. Meat processing apparatus comprising: an elongate enclosure having an inlet end and an outlet end with a plurality of treatment zones defined therebetween; a plurality of walking beam conveyors in said enclosure extending from the inlet end to the outlet end and movable between a retracted position in the direction of said inlet and an extended position in the direction of said outlet; lifting means in each treatment zone operable to lift products carried by said conveyors from said conveyors prior to a retraction movement of said conveyors and to return the products onto the conveyors prior to an extension movement of said conveyor; a plurality of transverse partitions in said enclosure defining the end walls of said treatment zones; an opening in each of said partitions permitting movement of products into and out of said treatment zones by said conveyors; a door mounted on each partition for movement between opened and closed positions with respect to the opening therein; and each of said partitions being formed with slots receiving said conveyors and permitting reciprocation thereof in any position of said doors.

31. Apparatus as claimed in claim 30 including, loading means for loading products onto said conveyor, said loading means including vertically movable loading racks operable to raise products to a height above each of said conveyors and to subsequently lower the products onto the conveyors in the retracted position thereof.

32. Apparatus as claimed in claim 31 wherein said loading means is supported at the inlet end of said enclosure for movement toward and away from said inlet.

33. Apparatus as claimed in claim 30 including unloading means for receiving products from said conveyors, said unloading means including vertically movable unloading racks operable to lift products from said conveyors at said outlet end and to subsequently lower the products to an unloading position.

34. Apparatus as claimed in claim 33 wherein said unloading means is supported at the outlet end of said enclosure for movement toward and away from said outlet.

* * * * *